June 22, 1965

J. RUDELICK 3,190,726

BRINER WITH ADJUSTABLE BRINE DRAW-OFF

Filed April 18, 1961

Inventor
John Rudelick
Attorney

June 22, 1965 J. RUDELICK 3,190,726
BRINER WITH ADJUSTABLE BRINE DRAW-OFF
Filed April 18, 1961 6 Sheets-Sheet 3
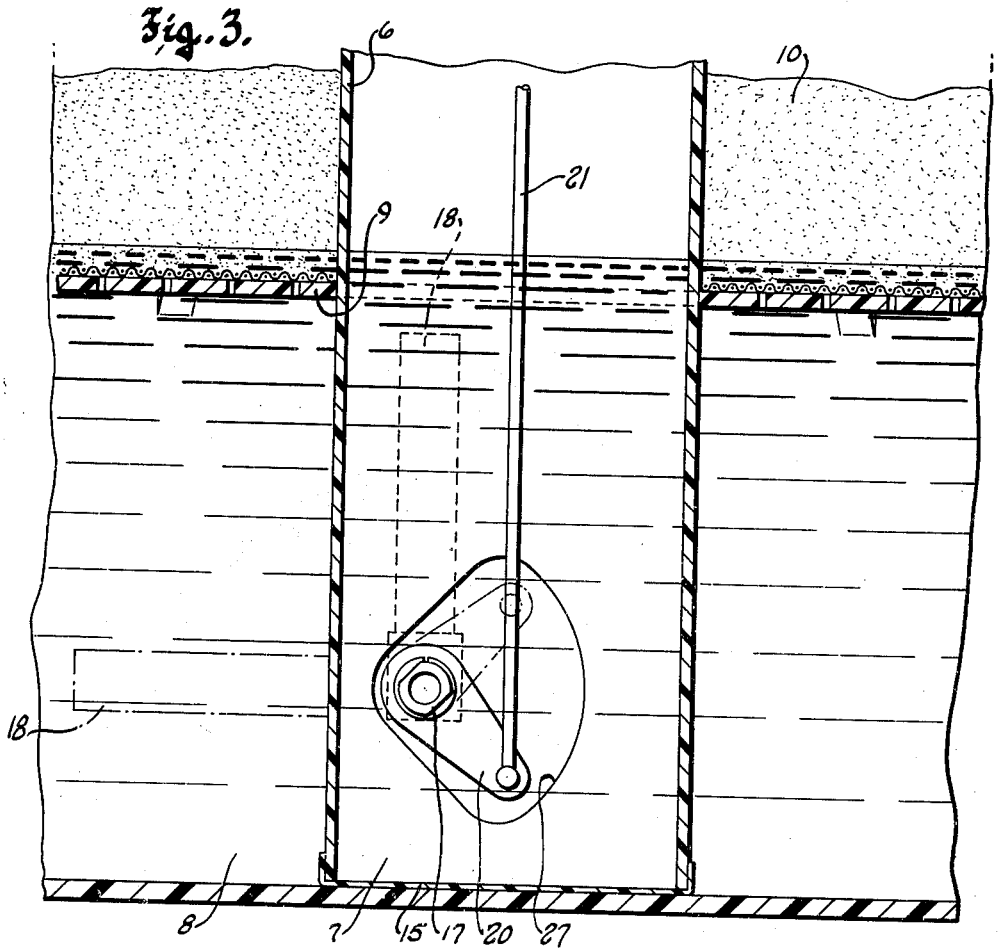
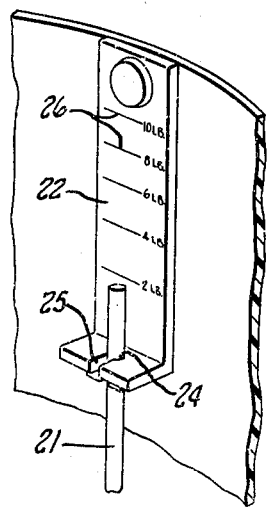
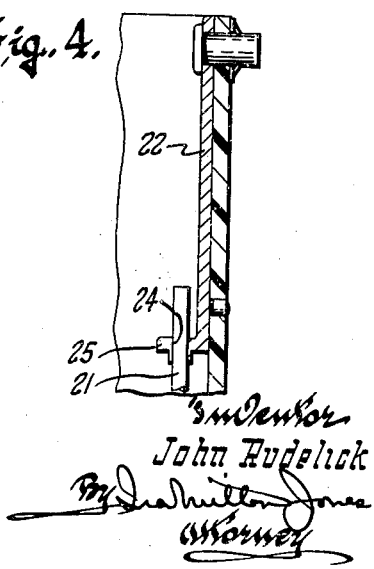
Inventor
John Rudelick June 22, 1965 J. RUDELICK 3,190,726
BRINER WITH ADJUSTABLE BRINE DRAW-OFF
Filed April 18, 1961 6 Sheets-Sheet 4

Inventor
John Rudelick

June 22, 1965

J. RUDELICK 3,190,726

BRINER WITH ADJUSTABLE BRINE DRAW-OFF

Filed April 18, 1961

Inventor
John Rudelick
By [signature]
Attorney

3,190,726
BRINER WITH ADJUSTABLE BRINE DRAW-OFF
John Rudelick, Milwaukee, Wis., assignor to Bruner Corporation, Milwaukee, Wis., a corporation of Wisconsin
Filed Apr. 18, 1961, Ser. No. 103,743
2 Claims. (Cl. 23—267)

This invention relates generally to water softening apparatus of the type comprising a softening tank which contains a bed of ion exchange material, and means for passing brine through the ion exchange material from time to time to effect regeneration thereof; and the invention refers more particularly to briners for such apparatus.

In one form of water softening apparatus which is in widespread use, brine for regeneration of the bed of ion exchange material in the softening tank is generated in a brine vessel which is separate from the softening tank, and which holds a substantially large store of salt. When regeneration is to be accomplished, brine is transferred from the brine vessel to the softening tank, usually by educting the brine into a stream of fresh water flowing to the softening tank. After the required quantity of brine has been withdrawn from the brine vessel, fresh water is filled into it, and during the subsequent period of service operation of the softener a new batch of brine is generated for use in the next regenerating cycle.

In many of the prior softeners of this type the store of salt rested on a bed of gravel or the like at the bottom of the brine vessel, and fresh water was filled into the vessel up to a predetermined level at which either the entire salt store or a substantial portion thereof was immersed in the water. During the subsequent period of service operation of the water softener, salt continued to pass into solution until the brine reached saturation or was withdrawn for the next regeneration cycle.

The brine vessel was usually divided, in such apparatus, by an upright partition that separated its interior into a brine compartment, in which the salt store was located, and a valve compartment which had a valve mounted in its bottom, and the two compartments were communicated with one another by means of an opening through the partition. The valve in the valve compartment provided an outlet for brine and an inlet for fresh water, and had a float actuator which closed it to stop the filling of fresh water into the brine vessel when liquid in the vessel reached a predetermined level. The opening through the partition, by which the valve and brine compartments were communicated with one another, was located at the bottom thereof, so that fresh water had to flow into the brine compartment and brine had to flow out of it through the bed of gravel upon which the salt rested.

In some cases the float actuator effected closure of the valve in the valve compartment before all of the brine had been educted from the brine vessel, to prevent air from being drawn into the fresh water flowing to the softening tank. In other instances the valve was left open for some time after all of the brine had been withdrawn so that air drawn into the valve could be bubbled through the ion exchange material along with the fresh rinse water being passed therethrough.

Whether or not aeration was used, however, the amount of brine that was drawn off from the brine vessel for each regeneration cycle could be controlled satisfactorily—although not precisely—by adjustment of the float actuator for the valve so as to regulate the level to which fresh water was filled into the vessel. There was some lack of precision in control of the volume of brine drawn off because the store of salt in the brine vessel was wholly or partially immersed in water, and it displaced a volume of liquid which could be determined as an average but which might vary to some extent from that average, depending upon the voids in the salt store. Moreover, resetting the brine drawoff to accommodate greater or lesser use of water in the service system was inconvenient because adjustment of the float actuator was in most cases an awkward and difficult procedure. A more serious objection to the prior type of briner was the fact that the gravel bed upon which the salt store rested was heavy and occupied a substantial volume in the briner, requiring a brine vessel that was disproportionately large for the amount of salt and brine it contained.

More recently there has been developed what may be referred to as a dry salt platform type of briner, on the order of that disclosed in my copending application Serial No. 66,379, filed October 26, 1960, now U.S. Patent No. 3,058,816, issued October 16, 1962, for Method of and Apparatus for Use in Regenerating Ion Exchange Devices. In a dry salt platform brining system the salt store is supported on a foraminous horizontal supporting member or platform which is spaced above the bottom of the brine vessel, and water is filled into the brine vessel to a level which is only very slightly above the supporting member. Hence only a very thin layer of salt at the very bottom of the salt store is in contact with water, while the greater part of the salt store is at all times above the water level, and therefore dry. As salt is dissolved from the bottom of the store, the resultant brine falls to the bottom of the brine vessel, due to the fact that brine has a higher specific gravity than fresh water, and fresh water is thereby displaced upwardly into contact with the salt store. There is thus created a natural circulation in the brine vessel which continues until all of the water therein has been converted to saturated brine.

Besides eliminating the bed of gravel in the bottom of the brine vessel, the new dry salt platform brining system has certain advantages over prior brining systems that make it particularly suitable for use in automatic water softeners, which are becoming increasingly popular. For example, the amount of salt in the brine vessel can always be readily determined by inspection, whereas with the former types of briners "bridging" of the salt store often created the appearance of an ample salt supply when in fact only a hollow shell of salt was present in the vessel.

One problem that has presented itself with dry salt platform brining systems, however, has been that of regulating the amount of brine that is withdrawn from the brine vessel at each regeneration. Since the height of the salt supporting member or platform cannot be conveniently changed, and the brine vessel must invariably be filled with water to a level slightly above that of the salt supporting member, it is obvious that the amount of brine to be withdrawn from the vessel cannot be controlled by regulating the level to which the vessel is filled. Nevertheless, the successful employment of a dry salt platform brining system requires the provision of some simple means for effecting such control in order to insure complete regeneration of the ion exchange material without waste of salt.

With this in mind it is a general object of this invention to provide simple and inexpensive means in a dry salt platform brining system of the character described for effecting very accurate regulation and control of the amount of concentrated brine to be withdrawn from the brine vessel at each regeneration cycle, whether or not aeration of the ion exchange material is provided for.

In fact the accuracy of control of brine withdrawal which the present invention makes possible is greater than the best that could be obtained with prior types of briners, so that it may be considered to be a very important general object of this invention to provide a brining apparatus for a water softener of the character described whereby the quantity of salt used for each regeneration can be very closely adjusted to the requirements of the particular water softener installation, so as to insure complete regeneration of its ion exchange material without waste of salt. This follows from the fact that the salt solution in the brine vessel normally reaches saturation in the intervals of service operation between regenerations, so that a constant and ascertainable quantity of salt will always be withdrawn from the vessel in a given volume of concentrated brine.

Another general object of this invention is to provide very simple and readily adjustable means for regulating the quantity of brine that is withdrawn from a dry salt platform briner at each brining operation, without requiring adjustment of either the salt supporting platform, the valve which controls brine withdrawal and fresh water filling, or the float actuator for said value.

More specifically, it is an object of this invention to provide, in a briner of the dry salt platform type, simple control means for adjusting the quantity of brine drawn from the briner at each brine withdrawal, which control means can be calibrated in terms of pounds of salt so that it can be readily adjusted to suit the regeneration requirements of ion exchange material in a water softening tank.

Another object of this invention resides in the provision of simple and readily controllable means for repeatedly drawing off any desired quantity of liquid from a vessel which is refilled with liquid after each withdrawal to an invariable predetermined level.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

FIGURE 3 is a fragmentary sectional view on a larger scale, taken on the plane of the line 3–3 in FIGURE 1;

FIGURE 4 is an enlarged vertical sectional view of the guide element in the apparatus shown in FIGURES 1–3;

FIGURE 5 is a fragmentary perspective view of the same guide element;

Figure 1:
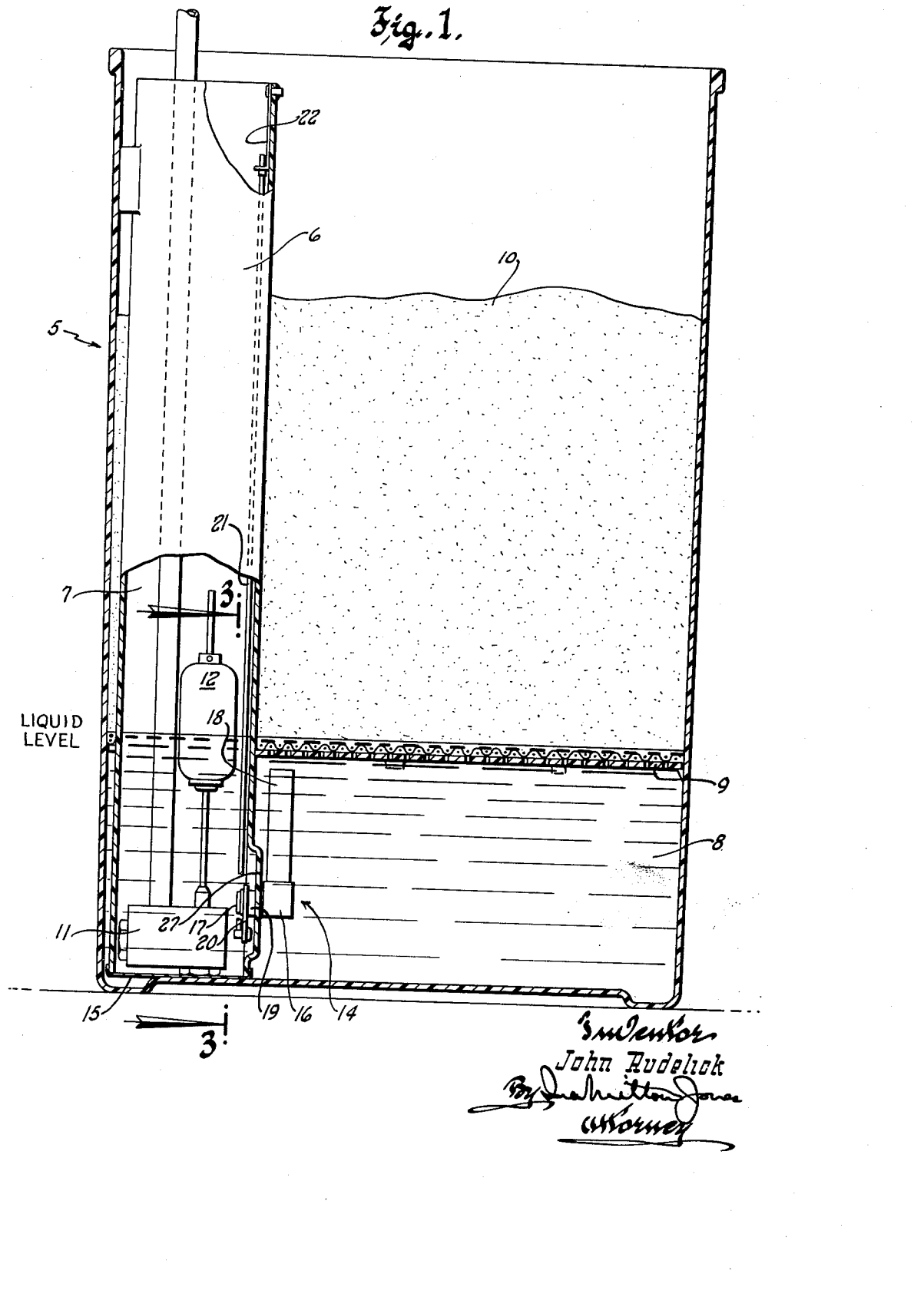
FIGURE 1 is a vertical sectional view of a water softener briner embodying the principles of this invention, showing the same filled to its normal liquid level for brine generation.

Referring now to the accompanying drawings, the numeral 5 designates generally the brine vessel of a dry salt platform type of briner for a water softening apparatus, which has an upright tubular partition member 6 at one side thereof that divides its interior into a valve compartment 7, inside the partition member, and a brine compartment 8 occupying that portion of the vessel interior which is outside the tubular partition. A foraminous horizontal salt supporting member or platform 9 extends across the brine compartment at a level spaced above the bottom of the vessel, and on it is maintained a salt store 10 from which brine is formed.

When the briner is in use, fresh water for brine formation is filled into it through a float actuated valve 11 which is mounted at the bottom of the valve compartment. The valve 11 is so controlled by its float actuator 12 that it closes to shut off the supply of fresh water when liquid in the vessel reaches a level very slightly above that of the salt supporting member 9, as illustrated in FIGURE 1. During the period after the vessel is filled the water dissolves salt from the bottom of the salt store 10 to form brine, and because brine has a higher specific gravity than fresh water, there is a natural circulation in the vessel which keeps the least concentrated solution uppermost, in contact with the salt, until all of the water in the vessel has become saturated salt solution. Meanwhile the major portion of the salt store remains dry so that "bridging" cannot occur in it and so that the amount of salt in the vessel can always be accurately determined by mere inspection.

When regeneration is to take place in the water softening apparatus (not shown) of which the brine vessel 5 forms a part, the concentrated brine is withdrawn from the vessel through the valve 11 until liquid in the valve compartment reaches a predetermined low level, whereupon the valve closes. Preferably, as illustrated in FIGURE 2, the valve is closed while there is still a certain amount of brine remaining in the valve compartment, to prevent the entry of air into the water softening system, but the valve 11 can of course be so adjusted as to provide for aeration if it is desired.

The valve 11, which has an upwardly opening port 13 (see FIGURE 2) that serves as both the brine outlet and the fresh water inlet for the brine vessel, can be of a conventional type, well known to those skilled in the art and therefore needing no further description here, although it is illustrated as being of the specific type shown in my copending application Serial No. 98,250, filed March 10, 1961, now Patent No. 3,095,008, entitled Float Valve Particularly for Water Softener Brine Vessels, to which reference may be made for details of its structure and operation.

Communication between the valve compartment 7 and the brine compartment 8 can take place only through a vertically adjustable communication means or spillway 14 that opens through the wall of the tubular partition member 6 and which can be set at different levels spaced above the port 13 in the valve 11 and below the horizontal salt supporting member 9. To prevent other communication between the brine compartment and the valve compartment, the tubular partition member 6 has a cap 15 on its bottom or is otherwise sealed off at its bottom to prevent liquid from passing under its lower edge.

Figure 2:
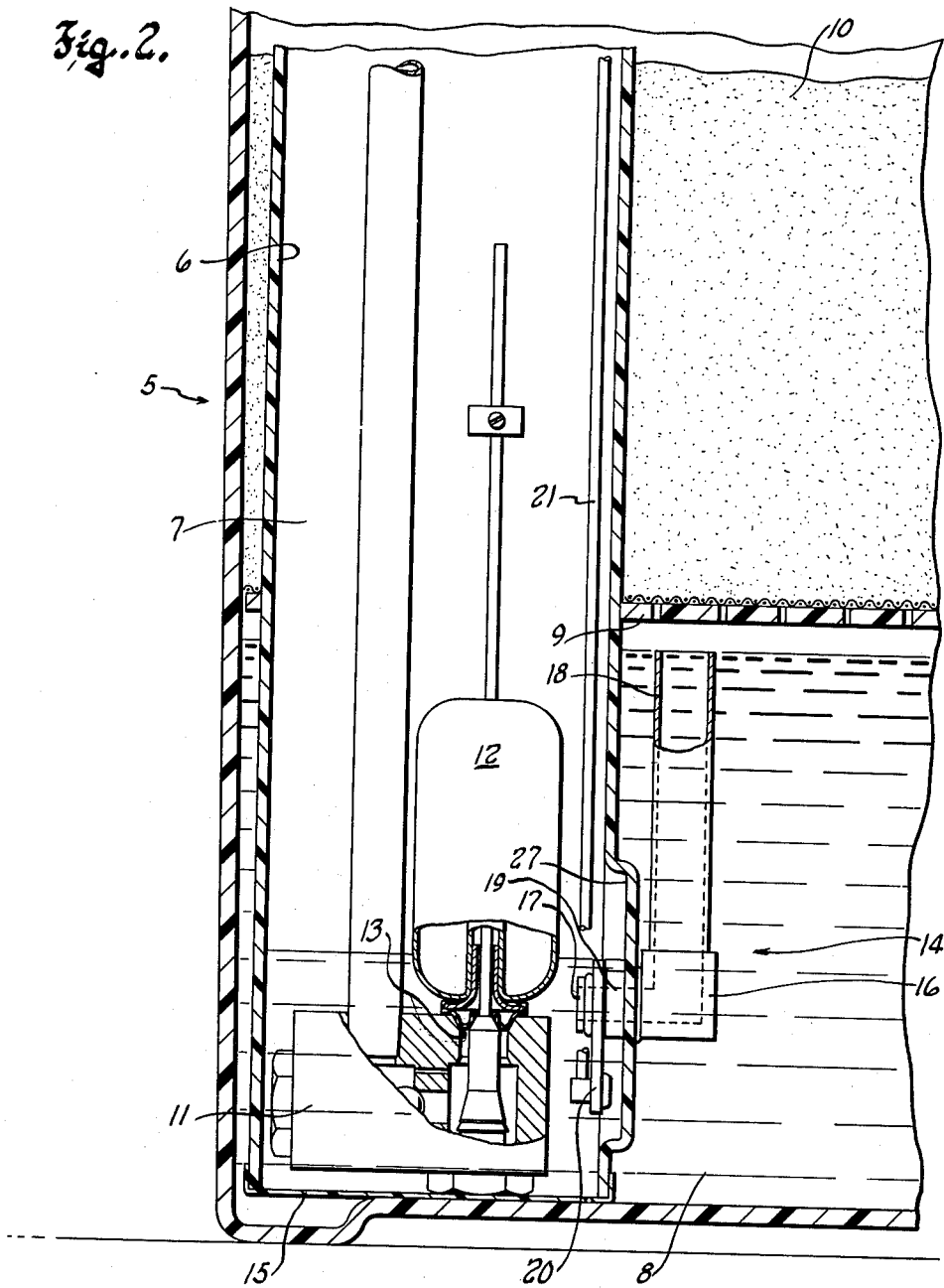
FIGURE 2 is a fragmentary view similar to FIGURE 1 but on a larger scale, and showing the briner at the conclusion of withdrawal therefrom of the minimum quantity of brine for which the apparatus can be adjusted.

In the embodiment of the invention illustrated in FIGURES 1 to 3 the adjustable communication or spillway 14 comprises a right angle duct 16 having one leg 17 journaled in the wall of the partition member 6 for rotation on a substantially horizontal axis and its other leg 18 substantially elongated and located in the brine compartment. The elongated leg 18 projects substantially radially to the rotational axis of the duct, so that it can be swung, in consequence of rotation of the duct about said axis, from a substantially upright position to a substantially horizontal position. Obviously the level of liquid in the brine compartment can never fall below the outer end of the leg 18, since the right angle duct constitutes the only outlet from the brine compartment, and consequently the minimum amount of brine is withdrawn from the brine compartment, at each withdrawal, when the elongated leg 18 is in its upright position, while the maximum possible withdrawal of brine occurs when the leg 18 is horizontal, with intermediate positions of said leg providing for withdrawal of intermediate amounts of liquid. The two extreme positions of the leg 18, for maximum and minimum brine draw-off, are illustrated in FIGURE 3.

Preferably the shorter leg 17 of the right angle duct is journaled in a bushing 19 which extends through the wall of the partition member and which affords a seal to insure that all flow of liquid between the brine and valve compartments will take place through the duct.

To facilitate rotational adjustment of the right angle duct, a crank arm 20 is secured to the end portion of its short horizontal leg 17 that projects into the valve compartment, and a rod 21 which extends upwardly in the valve compartment has its lower end connected to the radially outer end of the crank arm and its upper end portion received in a guide 22 that is fixed on the wall of the partition member 6, near the top thereof. The guide 22 is formed of a somewhat resilient material and has a vertical bore 24 therein of a normal diameter slightly smaller than that of the rod and a slot 25 that opens radially outwardly from the bore, so that the guide can be expanded slightly to allow the rod to be received in the bore with a snug fit, whereby the guide frictionally holds the rod in any position of axial adjustment in which it may be placed. If desired, indicia 26 can be marked on the guide or on the wall of the partition member, where the top of the rod can align with them in each of a number of different axial positions of the rod, to show the quantity of salt in the form of brine drawn off at each designated setting of the right angle duct. In view of the fact that saturated salt solution is normally drawn out of the briner, the indicia 26 can be calibrated in terms of pounds of salt.

It is to be noted that even after brine ceases to be withdrawn from the brine compartment through the adjustable communication or spillway 14 provided by the right angle duct 16, brine is drawn out of the valve compartment until the liquid therein falls to a lower level at which the valve 11 closes. Hence the total amount of brine that is taken out of the briner at each withdrawal will be that quantity which is drawn out of the brine compartment, as adjustably determined by the setting of the spillway means 14, plus a fixed and invariable amount drawn out of the valve compartment, as established by the operation of the float actuator 12 of the valve 11. When fresh water is filled into the briner, the lower portion of the valve compartment will of course be filled first, up to the level established by the spillway 14, and only then will water begin to enter the brine compartment.

To provide adequate clearance for the crank arm 20 to swing, the wall of the partition member 6 has a boss 27 formed therein, comprising an integral flat wall portion which is quadrant-shaped as viewed in elevation, and in which the bushing 19 is mounted.

Figure 6:
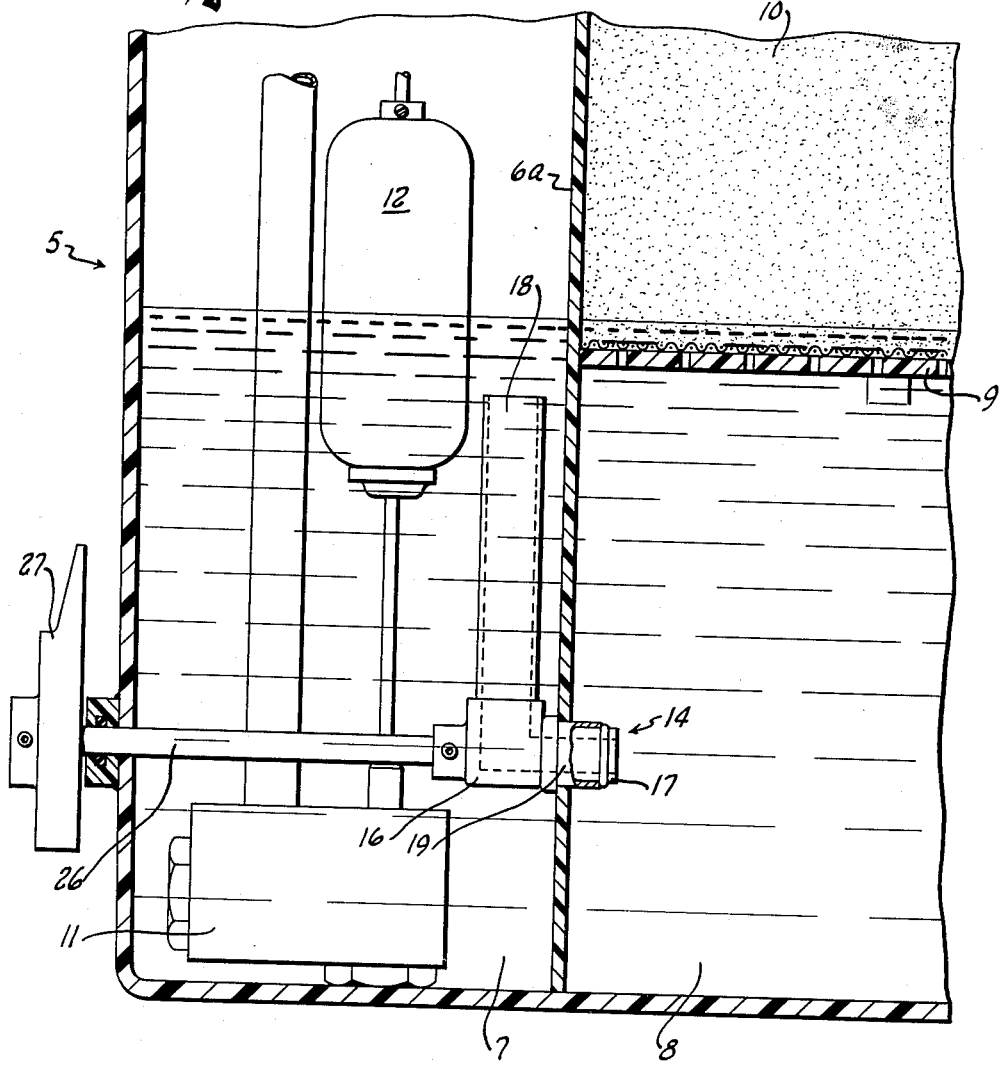
FIGURE 6 is a vertical sectional view of another embodiment of the apparatus of this invention.

It will be apparent that the right angle duct 16 can be turned end-for-end, to have its longer radially projecting leg 18 located in the valve compartment, and the spillway means would then be equally effective in controlling the level to which brine is drawn off from the brine compartment, and would function in the same manner. Such an arrangement is shown in FIGURE 6, wherein the upright rod 21 and the guide 22 are replaced by a horizontal shaft 26 which is secured to the elbow portion of the right angle duct coaxially with its rotational axis, and which extends through the wall of the brine vessel 5 to have a pointer knob or dial actuator 27 secured to its outer end portion. In locating the longer leg 18 of the right angle duct in the valve compartment 7, care must be taken to see that it has sufficient space for its swinging movement within the confines of that compartment, and in this case, to provide more space, the partition member 6a comprises a flat wall which extends entirely across the brine vessel.

Figure 7:
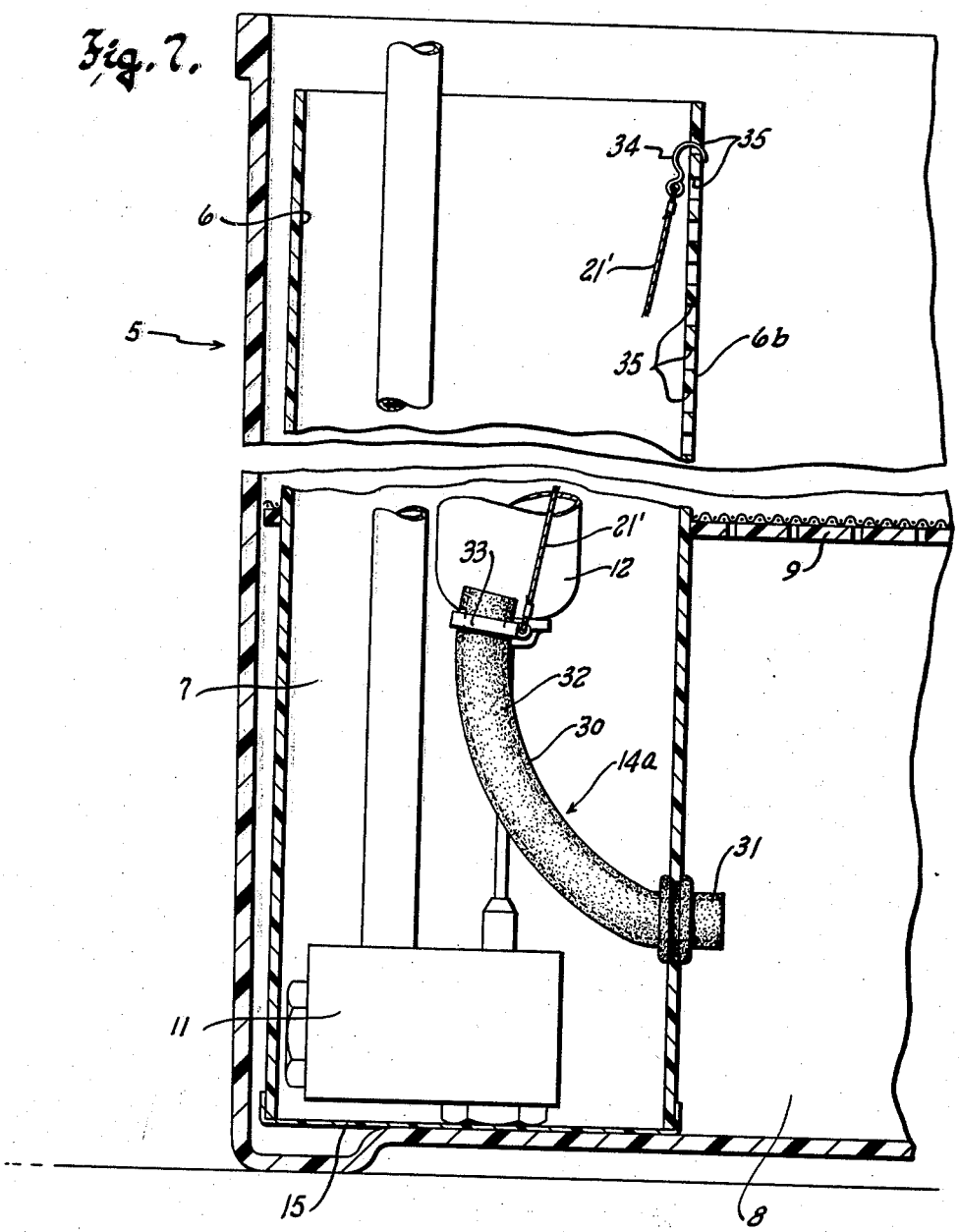
FIGURES 7, 8 and 9 are likewise vertical sectional views, each showing another different embodiment of the invention.

In the embodiment of the invention shown in FIGURE 7 the adjustable end portion of the spillway means 14a is likewise located in the valve compartment, but the spillway means comprises a length of flexible tubing or hose 30 which extends through the wall of the partition member 6b, with a short end portion 31 in the brine compartment and a substantially longer end portion 32 in the valve compartment. A wire 21' which extends upwardly in the valve compartment has its lower end secured to the longer end portion 32 of the hose, near the extremity thereof, as by means of a collar 33 on the hose, and has a hook 34 at its upper end which is engageable in any one of a number of vertically spaced holes 35 in the wall of the partition 6b, all located well above the level of the salt supporting member 9, to hold the extremity of the longer end portion 32 of the hose at any desired elevation. While very simple and inexpensive, it will be apparent that this form of the invention does not afford the closeness of regulation of brine volume draw-off which is possible with the previously described versions of the invention, and again presents the problem of insuring that the longer end portion 32 of the hose has sufficient room for swinging adjustment within the confines of the valve compartment 7.

Figure 8:
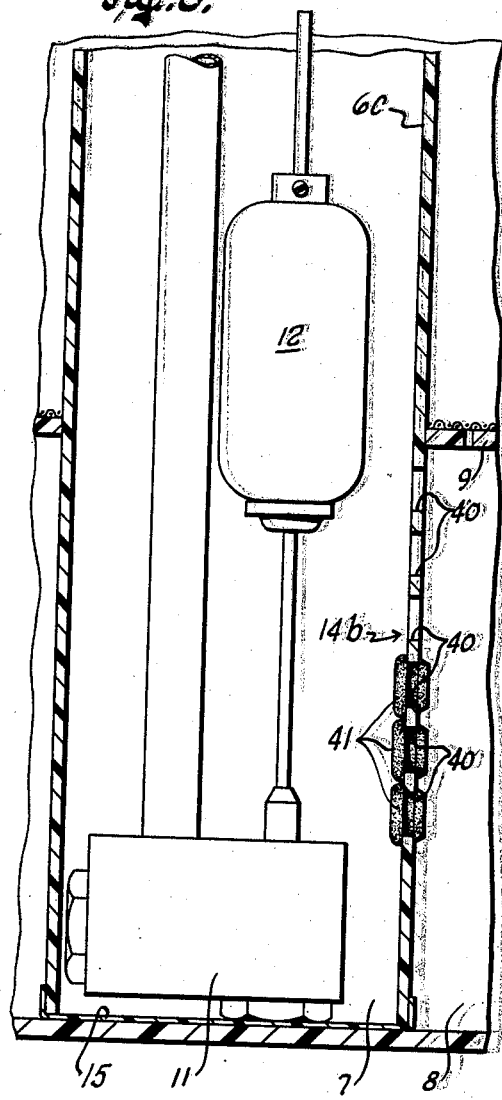

The embodiment of the invention illustrated in FIGURE 8 likewise has the advantage of being simple and inexpensive and the disadvantage of providing only a limited number of adjustments. In this version the adjustable spillway 14b comprises a series of vertically spaced apart holes 40 through the wall of the partition member 6c, all located above the level of the valve 12 and below the level of the salt supporting member 9. A plug 41 is inserted in each hole 40 that is below the level to which brine is intended to be drawn off from the brine compartment, and the unplugged holes then provide communication between the brine and valve compartments until the liquid in the brine compartments falls to the level of the bottom of the lowest unplugged hole. This embodiment of the invention is best adapted to rather large briners, wherein the valve compartment is wide enough to permit ready access to the plugs 41 when they must be inserted or removed for adjustment of brine draw-off.

Figure 9:
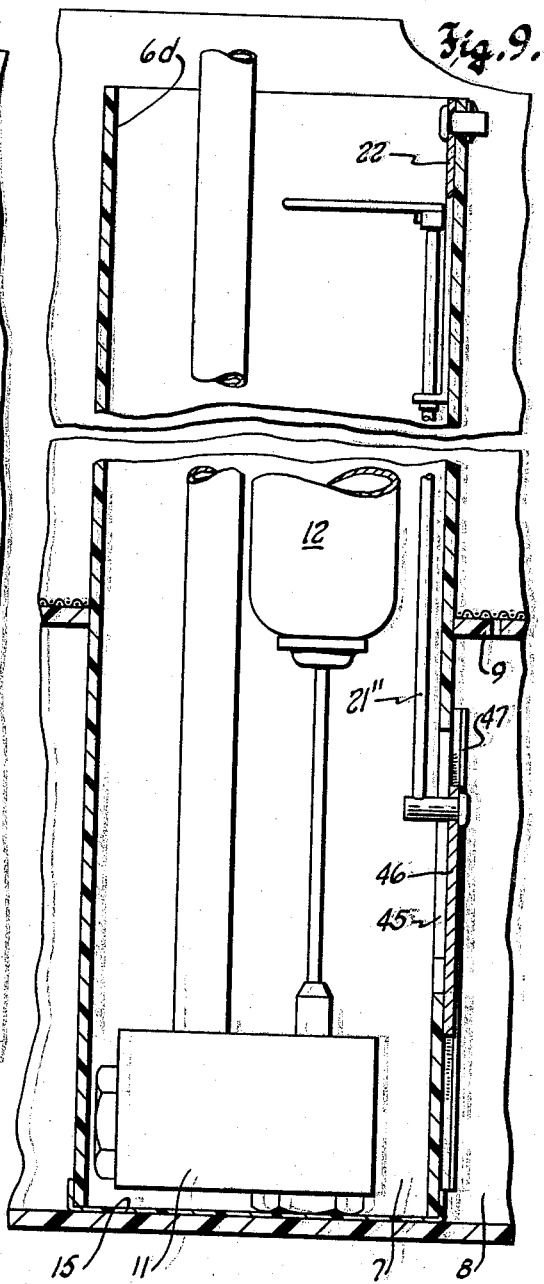

The embodiment of the invention illustrated in FIGURE 9 possesses many of the advantages of the first described version of the invention. In this case the wall of the partition member 6d has a vertically elongated slot 45 therein, and a plate 46, mounted for up and down sliding motion and flatwise overlying the wall surface, provides a weir across which liquid spills through the slot in passing from one compartment to the other. The upper edge of the plate 46 of course defines the lowest level to which liquid in the brine compartment can fall during brine withdrawal. A pair of S-section channel members 47, or the like, secured to the wall at opposite sides of the slot 45, provide upright guides which carry the plate 46 for up and down adjusting motion. Preferably the plate is mounted at the brine compartment side of the partition wall and is provided with suitable sealing means along its marginal edge portions that engage the underlying wall surface to prevent leakage which would permit the liquid level in the brine compartment to fall below the upper edge of the plate.

To facilitate adjustment of the vertical position of the plate, a rod 21" can be provided that extends upwardly in the valve compartment, with its lower end attached to the plate and its upper end portion received in a guide 22 which can be identical with the guide shown in FIGURES 4 and 5.

From the foregoing description, taken together with the accompanying drawings, it will be apparent that this invention provides a briner of the dry salt storage type, wherein salt is stored on a foraminous shelf-like supporting member spaced above the bottom of the brine vessel with only its very bottom portion in contact with water in the vessel, and in which the quantity of brine that is taken from the vessel at each withdrawal of salt solution therefrom can be very accurately and easily regulated without the necessity for changing the elevation of the salt supporting member or making adjustment to the float controlled valve which provides for withdrawal of brine from the vessel and filling of fresh water thereinto.

What is claimed as my invention is:

1. In apparatus comprising a vessel in which brine is generated and from which brine is periodically withdrawn, valved means at the bottom of the vessel through which brine is withdrawn and through which fresh water is filled into the vessel for generation of brine to replace that which was withdrawn, and a float actuator which is movable up and down and operatively connected with the valved means to terminate filling of fresh water into the vessel when liquid therein rises to a predetermined level, means for accurately predetermining the amount of salt withdrawn from the vessel in solution at each withdrawal of brine therefrom, said means comprising: upright partition means in the vessel defining at one side thereof a control compartment in which the valved means and its float actuator are located, and the top of which compartment is above said predetermined level, said partition means also cooperating with the vessel to define a brine compartment at the other side of the partition means; a foraminous horizontal supporting member extending across the brine compartment and adapted to support a store of salt, said supporting member being disposed a small distance below said predetermined level so that the bottom portion of a store of salt on the supporting member can be contacted by water in the vessel, for generation of brine, when the vessel is filled, and so that the amount of liquid in the vessel is independent of the amount of salt comprising such store; said partition means being imperforate except for a hole therein defining the bottom of a zone that extends upwardly to said predetermined level; an adjustable transfer tube in one of the compartments constituting the sole means of communicating it with the other compartment; means mounting the transfer tube on the partition means with one end portion of the tube at a fixed location and projecting through said hole in the partition means for communication with said other compartment, while providing for adjustment of the tube to dispose the mouth of its other end portion at different levels within said zone, whereby fresh water entering the control compartment can be transferred via the tube to the brine compartment to fill the same to said predetermined float-defined level only after the level of liquid in the control compartment rises to the level of said mouth of the transfer tube, while all brine withdrawn from the brine compartment is constrained to flow through the transfer tube to the control compartment, so that such brine withdrawal from the brine compartment is terminated when the brine level in the brine compartment drops to that of said mouth of the transfer tube, and the amount of brine thus withdrawn is dependent upon the level to which said mouth of the tube is adjusted in said zone; and means for releasably holding the transfer tube with said mouth thereof at any one of a number of different levels throughout said zone.

2. The apparatus of claim 1, further characterized by the fact that the portion of said transfer tube which extends through the hole in the partition means has its axis substantially horizontal and is rotatable on said axis; and further by the fact that the axis of said other end portion of the transfer tube is substantially radial to the axis of the horizontal portion thereof so that the elevation of the mouth of said other end portion of the transfer tube is determined by the rotational position of the tube.

References Cited by the Examiner

UNITED STATES PATENTS

| 841,176 | 1/07 | Powers | 210—242 X |
|---|---|---|---|
| 1,152,769 | 9/15 | Trent | 210—528 |
| 1,246,394 | 11/17 | Colby | 137—577 X |
| 2,935,081 | 5/60 | Kryzer | 137—391 |
| 2,985,514 | 5/61 | Lundeen | 23—311 X |
| 3,049,144 | 8/62 | Oleskow | 137—391 |
| 3,089,508 | 5/63 | Schulze et al. | 23—267 X |
| 3,095,005 | 6/63 | Thompson | 137—391 |

NORMAN YUDKOFF, *Primary Examiner.*

JAMES TAYMAN, *Examiner.*